United States Patent
Tabak et al.

(10) Patent No.: US 12,209,316 B2
(45) Date of Patent: Jan. 28, 2025

(54) PROCESS FOR COATING ONTO GALVANIZED SURFACES

(71) Applicant: BORCELIK CELIK SAN. TIC. A. S., Bursa (TR)

(72) Inventors: Derya Tabak, Bursa (TR); Oguz Yildirim, Bursa (TR); Aydin Ersoy, Bursa (TR); Sertac Ozer, Bursa (TR)

(73) Assignee: BORCELIK CELIK SAN. TIC. A.S., Bursa (TR)

( * ) Notice: Subject to any disclaimer, the term of this patent is extended or adjusted under 35 U.S.C. 154(b) by 0 days.

(21) Appl. No.: 18/028,783

(22) PCT Filed: Apr. 8, 2021

(86) PCT No.: PCT/TR2021/050328
§ 371 (c)(1),
(2) Date: Mar. 28, 2023

(87) PCT Pub. No.: WO2022/081108
PCT Pub. Date: Apr. 21, 2022

(65) Prior Publication Data
US 2023/0332296 A1    Oct. 19, 2023

(30) Foreign Application Priority Data

Oct. 12, 2020   (TR) .................. 2020/16190

(51) Int. Cl.
*C23C 2/24* (2006.01)
*C23C 2/02* (2006.01)
(Continued)

(52) U.S. Cl.
CPC .......... *C23C 28/3225* (2013.01); *C23C 2/024* (2022.08); *C23C 2/06* (2013.01); *C23C 2/26* (2013.01); *C23C 22/10* (2013.01); *C23C 22/76* (2013.01); *C23C 28/34* (2013.01); *C23C 2222/10* (2013.01)

(58) Field of Classification Search
CPC ..... C23C 28/3225; C23C 2/024; C23C 22/76; C23C 2222/10
See application file for complete search history.

(56) References Cited

U.S. PATENT DOCUMENTS

2010/0132849 A1*   6/2010   Takagi ................ C23C 2/02
148/330

FOREIGN PATENT DOCUMENTS

| CN | 101429638 A | * | 5/2009 | ............... C23C 2/06 |
| CN | 110252630 A | | 9/2019 | |

(Continued)

OTHER PUBLICATIONS

CN-101429638-A English translation. (Year: 2009).*

*Primary Examiner* — Hai Y Zhang
(74) *Attorney, Agent, or Firm* — Bayramoglu Law Offices LLC

(57) ABSTRACT

Disclosed are processes of applying a coating material to galvanized surfaces or materials, which provides significant increases in corrosion resistance. The coating material mentioned herein is applied to the material or surfaces in such a way that the coating can provide the best performance. The obtained coating material is applied to galvanized material or surfaces by making appropriate improvements to the coating material without requiring additional equipment and processes.

2 Claims, 1 Drawing Sheet

(51) Int. Cl.
*C23C 2/06* (2006.01)
*C23C 2/26* (2006.01)
*C23C 22/10* (2006.01)
*C23C 22/76* (2006.01)
*C23C 28/00* (2006.01)

(56) References Cited

FOREIGN PATENT DOCUMENTS

| | | | |
|---|---|---|---|
| CN | 110283972 A | 9/2019 | |
| EP | 2589677 A1 | 5/2013 | |

* cited by examiner

PROCESS FOR COATING ONTO GALVANIZED SURFACES

CROSS REFERENCE TO THE RELATED APPLICATIONS

This application is the national stage entry of International Application No. PCT/TR2021/050328, filed on Apr. 8, 2021, which is based on and claims priority to Turkish Patent Application No. 2020/16190, filed Oct. 12, 2020, the entire contents of which are incorporated herein by reference.

TECHNICAL FIELD

The invention is related to the application of coatings that provide a significant increase in corrosion resistance by coating galvanized surfaces in certain micron ranges, as well as providing additional features such as anti-fingerprint, being a ready-to-dye surface, facilitating shaping, and high-temperature resistance.

The invention belongs to the technical field in which corrosion-resistant coatings for galvanized surfaces that increase corrosion resistance and in particular do not contain chromate are provided.

BACKGROUND

Galvanizing is the process of making a protective coating containing zinc and zinc compounds on the surface of iron and steel materials. The protective coating usually consists of several layers. Those close to the basic metal are made up of iron-zinc compounds. Outside of these superposed layers, there is a layer consisting entirely of zinc. This complex structure of the layers forming the galvanized coating greatly changes the chemical composition, physical and mechanical characteristics, and affects their characteristics such as chemical activity, diffusion, and post-cooling. Minor changes in the coating composition, bath temperature, immersing time, cooling or post-heating cause significant changes in the appearance and characteristics of the coating. Zinc coatings applied on steel materials have four main characteristics. These are surface appearance, coating thickness, mechanical properties, and corrosion behavior.

Galvanized coatings have a proven commercial history under many environmental conditions. The corrosion resistance of galvanized coatings varies greatly depending on the environment in which they are used. Generally, under the most common environmental conditions, galvanized steels are more resistant to corrosion than non-galvanized steels, ranging from 1/10 to 1/30. Galvanized iron and steel materials are in contact with hundreds of different chemicals, fresh water, seawater, soil, concrete, and other atmospheric contaminants in both open and closed atmospheric environments in which they are used. Therefore, a wide variety of data on the advantages of zinc coatings are available in the technical field, as they have been used for corrosion protection for years. However, the predictability of the lifetime of zinc coatings is very important in terms of planning, cost, and maintenance.

With the advancement of technology and the industry, expectations from galvanized steel materials are increasing. Accordingly, steel materials are expected to have good additional mechanical characteristics such as friction coefficient, being a ready-to-dye surface, facilitating shaping, and high-temperature resistance, as well as increased corrosion resistance. To meet these expectations, companies in the sector are trying to find many solutions.

As known in the art, coating materials of various structures are applied to provide additional characteristics to galvanized sheet materials. Depending on the characteristics of the coating materials, the application processes of the sheet material also vary. For the coating materials to be applied to sheet materials, the surface cleaning should be performed very well. Also, sheet material application of coating materials is generally carried out at temperatures of 200° C. and above. The adverse effects of high temperatures on materials are known in the art. For this reason, it is predicted that low-temperature applications to the materials will both remove the negative effects on the material and provide economic benefits.

As a result, all the problems mentioned above made it necessary to make an innovation in the related technical field.

SUMMARY

The present invention is related to the process of applying coating material that provides a significant increase in corrosion resistance by coating galvanized surfaces in certain micron ranges to eliminate the above-mentioned disadvantages and to bring new advantages to the relevant technical field.

An object of the invention is to provide sheet material with high corrosion resistance values.

An object of the invention is to eliminate the high temperature and additional surface cleaning processes during the application of the coating material to the sheet material.

An object of the invention is to obtain a faster-integrated production process per unit of time.

An object of the invention is to obtain a coating material application process to a sheet material integrated into a conventional galvanizing production line.

To fulfill all the objectives mentioned above and that will emerge from the detailed description below, the present invention is related to the application processes of coating material that provides a significant increase in corrosion resistance by coating galvanized surfaces in certain micron ranges. Accordingly, the said coating material is characterized in that it includes the following steps in which processes are carried out on a single line during the application to the sheet material and additionally surface cleaning and high-temperature processes are eliminated, firstly, treating the hot-rolled sheet material raw material with hydrochloric acid in the CPL line to clean the oxide layers thereon;

Reducing the descaled sheet material to target thicknesses suitable for use in the RCM line, which is called the cold rolling unit;

Transferring the sheet material whose thickness has been adjusted to the desired dimensions to the continuous galvanizing line and surface cleaning between 620 and 760° C. in the NOF section on this line, the application of annealing process at the temperatures between 670 and 83° C. in the RTH section, applying the galvanizing processes in the zinc pot at certain concentration ratios between 455 and 480° C., the application of the SPM process at room temperature and the application of the coating material to the material at temperatures between 25° C. and 40° C. on the same line (continuous galvanizing line);

Application of drying processes and transferring of the product to the final production lines where the final form is obtained.

In a possible embodiment of the invention, the said coating material comprises chromium nitrate component at a value between 1% and 10% by weight; chromium phosphate component at a value between 1% and 10% by weight; methanol at a value between 1% and 10%; ethanol at a value between 1% and 10%; phosphoric acid at a value between 1% and 10%; nitric acid compounds at a value between 1% and 10%. Thus, by coating galvanized surfaces in certain micron ranges, it is possible to obtain a sheet material with high-temperature resistance, which provides a significant increase in corrosion resistance, as well as fingerprint-free, dye-ready surface, facilitating shaping.

In a possible embodiment of the invention, the coating material is coated on the sheet material between 0.5 and 5 micron values.

DETAILED DESCRIPTION OF THE INVENTION

Figure 1:
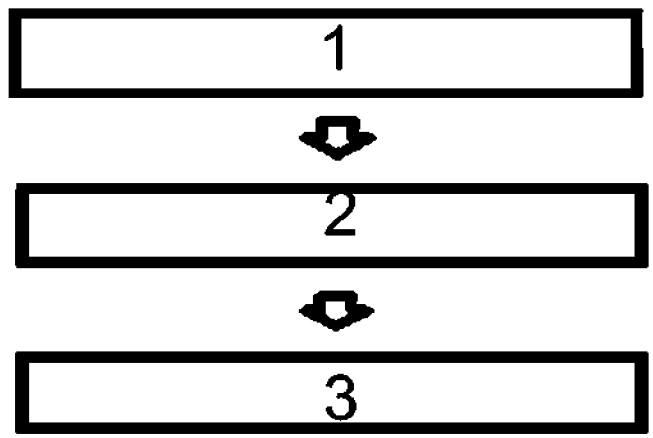
In FIG. 1, the schematic view of the production line of the invention is given.

Reference numbers given in FIG. 1 are as follows:
1 Continuous Pickling Line
2 Reversible Cold Rolling Line
3 Continuous Galvanizing Line The subject of the invention is related to the application processes of coating materials that provide a significant increase in corrosion resistance by coating galvanized surfaces in certain micron ranges, as well as providing additional features such as anti-fingerprint, improvement in dyeability, facilitating shaping and high-temperature resistance; it is explained with examples that do not have any limiting effect only for a better understanding of the subject.

Generally, corrosion (rusting, also called chemical corrosion) is the reaction of a material or surface with its environment and it causes measurable and analyzable deterioration and changes in the characteristics of that material or surface. Many structural alloys corrode only by exposure to moisture in the air, but the process can be seriously affected by exposure to certain substances.

Corrosion can be concentrated in one area to form a cavity or crack, or it can be spread over a large area that corrodes the surface of a material more or less equally.

Corrosion can be observed in many materials; generally, it has a high effect on metal surfaces. Several processes are applied to prevent these damages for the aforementioned material or surfaces, and one of the most frequently used methods is making galvanized coatings.

Said galvanized surface is a zinc coating at certain micron thickness values to gain corrosion resistance and/or anti-corrosion characteristics, especially for a metal bottom layer. Using the coating of zinc in certain micron values on the metal bottom layer, it is ensured that certain corrosion resistance values are reached.

The galvanized surface mentioned here can be obtained by many different methods, as it is known in the art.

In addition to materials or surfaces with high corrosion resistance performance, anti-corrosion coatings can be applied. More specifically, various coating compositions (phosphating, chromating, and other coating types) are applied on galvanized coating for sheet materials. The coating material of the invention is applied to galvanized materials or surfaces to provide additional corrosion resistance as mentioned.

The innovative aspect of the invention is the process of applying said coating material to galvanized sheet materials. As is known in the art, coating materials with or without chromate can be applied to galvanized sheet materials to provide additional corrosion resistance. The coating material of the invention has chromate-free components, and besides providing corrosion resistance to the sheet material, it adds characteristics such as anti-fingerprint, high-temperature resistance, low friction coefficient, and improving paint retention characteristics.

The coating material used in the invention can be specified as an environmentally friendly coating material, as it contains components that do not contain chromate.

The coating material of the invention contains components such as chromium-containing compounds (not in the form of chromate compounds), methanol, nitric acid, or phosphoric acid in certain proportions by weight. More particularly, the coating material contains a chromium-containing component at a value between 1 and 20% by weight.

Said chromium-containing component may be +3 valence compounds of chromium. More specifically, the chromium-containing component can be chromium nitrate or chromium phosphate.

The chromium-containing component can be a single compound in the coating material, and can also be a mixture of two different chromium-containing components in certain proportions by weight. In a preferred embodiment, the chromium-containing component consists of a mixture of chromium nitrate and chromium phosphate compounds in certain proportions by weight. In a still preferred embodiment, the said coating material comprises chromium nitrate component at a value between 1% and 10% by weight, the chromium phosphate component at a value between 1% and 10% by weight.

The coating material contains other components that increase the performance and solubility of other components. As other mentioned performance-enhancing components, compounds such as methanol, ethanol, nitric acid, phosphoric acid are used. While at least one of the mentioned compounds is included in the coating material, in a preferred embodiment it is included in the all-in-one coating material.

In a preferred embodiment, the coating material comprises methanol at a value between 1% and 10% by weight; ethanol at a value between 1% and 10%; phosphoric acid at a value between 1% and 10%; nitric acid compounds at a value between 1% and 10%.

In the invention, the said coating material comprises chromium nitrate component at a value between 1% and 10% by weight; chromium phosphate component at a value between 1% and 10% by weight; methanol at a value between 1% and 10%; ethanol at a value between 1% and 10%; phosphoric acid at a value between 1% and 10%; nitric acid compounds at a value between 1% and 10%.

The obtained coating material is applied to galvanized sheet materials or galvanized surfaces at certain micron thickness values. Preferred micron values are between 0.5 and 10 microns. The micron value preferred in the invention is between 0.5 and 5 micron values.

The obtained coating material can be in a transparent or colored form depending on the applied material or the area where performance is desired. In its preferred embodiment, the coating material has a transparent appearance.

The innovative aspect of the invention is directed to processes of applying a coating material to galvanized surfaces or materials, which provides significant increases in corrosion resistance. Due to the processes mentioned here, it is ensured that the coating is applied to the material or surfaces in a way that the coating can provide the best performance. The main subject of the invention is that the obtained coating material is applied to galvanized material or surfaces by making appropriate improvements to the coating material on processes existing in the art without requiring additional equipment and processes.

The application of the coating material mentioned in the invention to galvanized materials or surfaces is given step by step below. In FIG. 1, a schematic form of the applied steps is shown.

Firstly, treating the hot-rolled sheet material raw material with hydrochloric acid in the Continuous Pickling Line (1) to clean the oxide layers thereon;

Reducing the descaled sheet material to target thicknesses suitable for use in the Reversible Cold Rolling Line (2), which is called the reverse cold rolling unit;

Transferring the sheet material whose thickness has been made suitable to the continuous galvanizing line (3) and surface cleaning on this line, the application of annealing process, the application of the SPM process (also mentioned as tempering mill), and the application of the coating material to the material on a single line (continuous galvanizing line);

Application of drying processes and transferring of the product to the final production lines where the final form is obtained.

The innovative aspect of the invention is the changes made in the continuous galvanizing line (3) where the coating material is applied to the sheet material, but not in the Continuous Pickling Line (1) and the Reversible Cold Rolling lines (2). Accordingly, in the production line called the continuous galvanizing line (3), the processes of annealing, galvanizing, and coating material application can all be performed together. This production section, known as the production section where the coating material obtained in this way is applied to the sheet material, does not contain additional degreasing and cleaning processes as it is in the art. Also, the coating material can be applied to the sheet material at temperatures that can be considered low in the art. Unit production time ranges from 7.5 minutes to 20.8 minutes.

In the invention, an integrated production line is formed and the processes of annealing, galvanizing, and coating material application are carried out in a single production line, also additional surface cleaning is not required, and processes that require high temperatures are also eliminated.

In FIG. 1, the schematic view of the mentioned production lines is given. Accordingly, the part indicated with reference number 1 is called the Continuous Pickling Line (1). In this section, hot-rolled sheet material coming as raw material is placed in hydrochloric acid pools of certain concentrations and surface cleaning is performed.

The part indicated with reference number 2 in FIG. 1 is called the Reversible Cold Rolling Line (2). In this section, it is ensured that the sheet material, whose surface is cleaned, is reduced to the target thickness to be used at low temperatures (room temperature).

Figure 2:
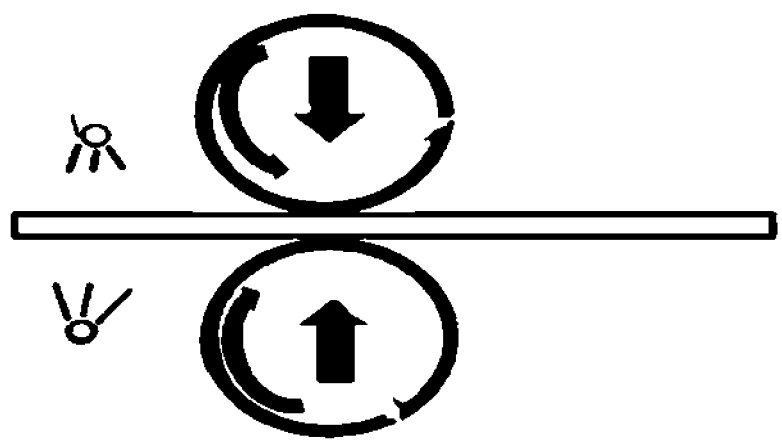
In FIG. 2, a representative view of the application of the obtained coating material to the sheet material in the production line is given.

The coating material for the galvanized sheet material is applied in the continuous galvanizing line (3) specified with reference number 3 in FIG. 1, as stated before. The continuous galvanizing line (3) is an integrated production line in which the processes of surface cleaning, annealing, galvanizing, SPM, coating material application are combined. The sheet material coming to the continuous galvanizing line (3) is firstly kept in the NOF (known as the non-oxidizing furnace in the art) section, which is the first section of the annealing unit for surface cleaning at certain temperatures for certain periods. In the mentioned NOF section, surface cleaning processes are applied to the sheet material at temperatures of 620 to 760° C. Then, the annealing processes are applied to the sheet material at certain temperatures and times in the RTH (known as radiant tube heating) section of the continuous galvanizing line (3). Annealing processes are applied to the sheet material at temperatures between 670 and 830° C. in the RTH section. After the application of temperature processes for a certain period, it is left to cool down and then the sheet material is immersed in the pot containing zinc at certain temperatures for galvanizing processes. Preferably, according to the characteristics of the product, zinc is applied to the sheet material at a value between 80 and 350 g. The temperature of the mentioned pot is between 455 and 480° C. SPM (skin pass mill) processes are applied to the galvanized sheet material. After the application of the SPM processes, the coating material obtained in the invention is applied to the galvanized sheet material. The coating material is sprayed on the sheet material from the nozzles located in the passivation unit of the continuous galvanizing line (3). The nozzles mentioned here are positioned to coincide with the lower and upper surfaces of the sheet material. In one embodiment, the coating material is sprayed to the lower part of the galvanized sheet material using nozzles while it is left on the upper part of the sheet material with gravity. The temperature value in this section is adjusted to a maximum of 40° C. Room temperature can be adjusted as the lowest temperature. As shown in FIG. 2, shafts are passed on the sheet material to which the coating material is applied to spread the coating material evenly.

If preferred, the SPM process may not be applied. The coating material can also be applied to sheet materials to which SPM processes are not applied.

Due to the coexistence of integrated production lines that include the above-mentioned production steps, the surface cleaning and high temperatures required for the application of additional coating material are eliminated. Thus, while providing a faster production per unit time, at the same time, it is ensured that the passivation processes that will create additional costs are eliminated.

As it is known in the art, the application of coating materials to galvanized sheet materials is carried out at temperatures of 200° C. and above. The adverse effects of high temperatures on materials are known in the art. For this reason, it is predicted that low-temperature applications to the materials will both remove the negative effects on the material and provide economic benefits.

The change of corrosion resistance of the obtained coating material to the sheet material after the application of the process steps mentioned in the invention is tested by various test methods. First of all, the classical corrosion test is carried out for galvanized sheet material without coating material. In the sample, whose entire surface was rusted within 24 hours, red rust was observed in 72 hours. On the other hand, it was observed that there was white rust in 528 hours and a little white rust in 1872 hours, and the test was ceased. In this way, it was observed that there was a significant increase in the corrosion resistance of the galvanized sheet material on which the coating material was applied.

What is claimed is:

1. A process of applying a coating material, wherein the coating material provides an increase in corrosion resistance and the coating material coats galvanized surfaces in certain micron ranges, comprising the steps: treating a hot-rolled sheet raw material with hydrochloric acid in a continuous pickling line to clean oxide layers thereon; reducing a descaled sheet material to a target thickness in a Reversible Cold Rolling Line, also called a cold rolling unit; transferring the sheet material having a thickness adjusted to desired dimensions to a continuous galvanizing line and surface cleaning between 620 and 760° C. in a non-oxidizing furnace (NOF) section on the continuous galvanizing line, performing an annealing process at a temperature between 670 and 830° C. in a radiant tube heating (RTH) section, wherein a galvanizing process in a zinc pot at certain concentration ratios is conducted between the temperature of 455 and 480° C., spraying the coating material to a lower part of a galvanized sheet material using nozzles between 25° C. and 40° C. band temperatures after a skin pass mill (SPM) process, wherein the process occurs to an upper part of the sheet material by gravity on a single continuous galvanizing line, thereby eliminating surface cleaning and high-temperature processes, wherein the process of applying the coating material to a sheet material is carried out on a single line, wherein said coating material comprises chromium nitrate component at a value between 1% and 10% by weight; chromium phosphate component at a value between 1% and 10% by weight; methanol at a value between 1% and 10% by weight; ethanol at a value between 1% and 10% by weight; phosphoric acid at a value between 1% and 10% by weight; and nitric acid compounds at a value between 1% and 10% by weight.

2. The process according to claim 1, wherein the coating material is coated on the sheet material between 0.5 and 5 micron thickness values.

\* \* \* \* \*